2,846,482
Patented Aug. 5, 1958

2,846,482
INHIBITION OF POLYMERIZATION OF VINYL CHLORIDE

Robert G. Roth, Edgewood, Md., and William F. Yates, Texas City, Tex., assignors to Monsanto Chemical Company, St. Louis, Mo., a corporation of Delaware No Drawing. Application December 7, 1955
Serial No. 551,505

11 Claims. (Cl. 260—652.5)

This invention relates to vinyl chloride. More specifically, this invention relates to an improved process for inhibiting the polymerization of vinyl chloride and to the novel inhibited compositions resulting therefrom.

The primary use of monomeric vinyl chloride is in the preparation of polyvinyl chloride and copolymers of vinyl chloride and other monomers. In such applications, monomeric vinyl chloride of very high purity is required. Monomeric vinyl chloride, however, on standing at room temperature, exhibits a tendency towards polymerization which results in a formation of solid compounds which contaminate the monomeric material. As the temperature is increased, the tendency of monomeric vinyl chloride to polymerize is also increased, and greater quantities of impurities or contaminants are formed. Vinyl chloride containing such polymerized impurities is not satisfactory for most applications, and such contaminated material must be repurified prior to use.

It is an object of this invention to provide an improved method for inhibiting the polymerization of vinyl chloride.

It is a further object of this invention to provide novel vinyl chloride compositions which are inhibited against polymerization.

Further objects will become apparent from the description of the invention which follows.

It has now been discovered that the polymerization of vinyl chloride can be significantly inhibited by incorporating therein a minor amount of phenyl haloformate having the formula

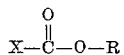

wherein X represents a halogen which can be chlorine, bromine, iodine or fluorine and R represents a phenyl radical. Vinyl chloride containing a minor amount of the aforementioned phenyl haloformates can be subjected to prolonged periods of storage without exhibiting any evidence of polymer formation.

The inhibiting effect of phenyl haloformates on vinyl chloride, in accordance with this invention, is determined by the following test procedure:

Benzoyl peroxide in the amount of 0.750 g. and 60 ml. of an 0.25% gelatin solution are placed in a clean, dry soda water bottle. The bottle and contents are cooled in ice water for a minimum of 10 minutes. The outside of the bottle is then dried and the bottle and bottle cap weighed to ±0.1 g.

Vinyl chloride, which has been cooled for 2 hours, is added to the bottle until a slight excess over 30 g. has been obtained. The excess over 30 g. is permitted to evaporate and the bottle capped. The weight of the bottle is rechecked after capping and the weight of vinyl chloride should be 30.0 g. ±0.3 g.

The bottle is permitted to warm to room temperature and then placed in a rack in the water bath which tumbles the bottle for 7 hours ±3 minutes at 50° C. ±0.5° C.

The bottle is removed from the bath and cooled to room temperature by placing it in water at 10°–20° C. The bottle is then placed in a Dry Ice chest until the contents are frozen.

The bottle cap is then punctured and the bottle and contents permitted to warm to room temperature and then placed in a water bath at 50° C. for one hour. At the end of this time, the bottle and contents are reweighed and the percent monomer polymerized calculated.

Example I

Uninhibited vinyl chloride is tested in accordance with the procedure described above. Eighty-one percent of the monomer polymerized.

Example II

Vinyl chloride containing 100 p. p. m. phenyl chloroformate is tested in accordance with the procedure described above. Sixty-nine percent of the monomer polymerized.

Example III

Vinyl chloride containing 200 p. p. m. of phenyl chloroformate is tested in accordance with the procedure described above. Only fifty-nine percent of the monomer polymerized.

Example IV

Vinyl chloride containing 100 p. p. m. of 2-methylphenyl chloroformate (a tolyl chloroformate) is tested in accordance with the procedure described above. The amount of monomer polymerized is significantly less than that amount polymerized in Example I.

Example V

Vinyl chloride containing 50 p. p. m. of 3-methylphenyl chloroformate (a tolyl haloformate) is tested in accordance with the procedure described above. The amount of monomer polymerized is significantly less than that amount polymerized in Example I.

Example VI

Vinyl chloride containing 500 p. p. m. of 2,3-dimethylphenyl chloroformate (a xylyl haloformate) is tested in accordance with the procedure described above. The amount of monomer polymerized is significantly less than that amount polymerized in Example I.

Example VII

Vinyl chloride containing 200 p. p. m. of 2,5-dimethylphenyl bromoformate (a xylyl haloformate) is tested in accordance with the procedure described above. The amount of monomer polymerized is significantly less than that amount polymerized in Example I.

Example VIII

Vinyl chloride containing 50 p. p. m. of 2,4-dibromophenyl bromoformate is tested in accordance with the procedure described above. The amount of monomer polymerized is significantly less than that amount polymerized in Example I.

Example IX

Vinyl chloride containing 100 p. p. m. of 2-hydroxyphenyl fluoroformate is tested in accordance with the procedure described above. The amount of monomer polymerized is significantly less than that amount polymerized in Example I.

Example X

Vinyl chloride containing 200 p. p. m. of 4-nitrophenyl iodoformate is tested in accordance with the procedure described above. The amount of monomer polymerized is significantly less than that amount polymerized in Example I.

Example XI

Vinyl chloride containing 300 p. p. m. of 2-chlorophenyl chloroformate is tested in accordance with the procedure described above. The amount of monomer polymerized is significantly less than that amount polymerized in Example I.

Example XII

Vinyl chloride containing 150 p. p. m. of 4-isopropylphenyl chloroformate is tested in accordance with the procedure described above. The amount of monomer polymerized is significantly less than that amount polymerized in Example I.

Example XIII

Vinyl chloride containing 100 p. p. m. of 4-(2-ethylhexyl) phenyl chloroformate is tested in accordance with the procedure described above. The amount of monomer polymerized is significantly less than that amount polymerized in Example I.

The phenyl radical in the phenyl haloformates used as inhibitors for vinyl chloride in accordance with this invention can be unsubstituted or can contain one or more substituents such as alkyl, nitro, hydroxyl, halogens, etc. Phenyl haloformates, wherein the phenyl group is unsubstituted or contains one or more alkyl substituents containing not more than 8 carbon atoms, are preferred. The xylyl and tolyl haloformates are particularly useful in the practice of this invention.

The phenyl haloformates of this invention exhibit an inhibiting effect on monomeric vinyl chloride over a wide range of concentration. From about 1 to 1000 parts by weight of the phenyl haloformates per million parts by weight of monomeric vinyl chloride have been found to be applicable. However, concentrations in the range of from about 10 parts by weight to about 500 parts by weight of the phenyl haloformate per million parts by weight of the monomeric vinyl chloride are particularly preferred.

Although the phenyl haloformates of this invention are excellent inhibitors per se for vinyl chloride, they can, if desired, be mixed with other known inhibitors for vinyl chloride.

This application is a continuation-in-part of our copending application Serial No. 343,786, filed March 20, 1953, now abandoned.

What is claimed is:

1. As a new composition of matter, vinyl chloride containing a minor amount of phenyl haloformate having the formula

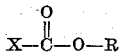

wherein X represents a halogen and R represents a phenyl radical.

2. As a new composition of matter, vinyl chloride containing a minor amount of a phenyl haloformate having the formula

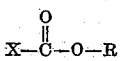

wherein X represents a halogen and R is selected from from the group consisting of the phenyl radical and alkyl substituted phenyl radicals, wherein the alkyl groups contain not more than 8 carbon atoms.

3. As a new composition of matter, vinyl chloride containing from about 1 to about 1000 parts by weight per million parts by weight of vinyl chloride of a phenyl haloformate, having the formula

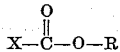

wherein X represents a halogen and R is selected from from the group consisting of the phenyl radical and alkyl substituted phenyl radicals, wherein the alkyl groups contain not more than 8 carbon atoms.

4. As a new composition of matter, vinyl chloride containing from about 10 to 500 parts by weight per million parts by weight of vinyl chloride of a phenyl haloformate, having the formula

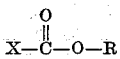

wherein X represents a halogen and R is selected from from the group consisting of the phenyl radical and alkyl substituted phenyl radicals, wherein the alkyl group contains not more than 8 carbon atoms.

5. As a new composition, vinyl chloride containing a minor amount of phenyl chloroformate.

6. As a new composition, vinyl chloride containing from about 1 part by weight to about 1000 parts by weight of phenyl chloroformate per million parts by weight of vinyl chloride.

7. As a new composition of matter, vinyl chloride containing from about 10 parts by weight to about 500 parts by weight of phenyl chloroformate per million parts by weight of vinyl chloride.

8. As a new composition of matter, vinyl chloride containing from about 10 parts by weight to about 500 parts by weight of tolyl chloroformate per million parts by weight of vinyl chloride.

9. As a new composition of matter, a vinyl chloride containing from about 10 parts by weight to about 500 parts by weight of xylyl chloroform per million parts by weight of vinyl chloride.

10. A process for inhibiting the polymerization of vinyl chloride which comprises incorporating therein a minor amount of a phenyl haloformate, having the formula

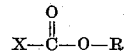

wherein X represents a halogen and R represents a phenyl radical.

11. A process for inhibiting the polymerization of vinyl chloride, which comprises incorporating therein a minor amount of a phenyl haloformate, having the formula

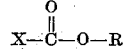

wherein X represents a halogen and R is selected from the group consisting of the phenyl radical and alkyl substituted phenyl radicals, wherein the alkyl groups contain not more than 8 carbon atoms.

No references cited.

UNITED STATES PATENT OFFICE

CERTIFICATE OF CORRECTION

Patent No. 2,846,482                                                August 5, 1958

Robert G. Roth et al.

It is hereby certified that error appears in the printed specification of the above numbered patent requiring correction and that the said Letters Patent should read as corrected below.

Column 1, line 19, for "prmary" read -- primary --; line 43, after "of" insert -- a --; column 3, line 49, after "of" insert -- a --; column 4, line 1, strike out "from"; line 40, after "matter," strike out "a"; line 42, for "chloroform" read -- chloroformate --.

Signed and sealed this 9th day of December 1958.

(SEAL)

Attest:
KARL H. AXLINE
Attesting Officer

ROBERT C. WATSON
Commissioner of Patents